(12) United States Patent
Kang et al.

(10) Patent No.: US 11,114,860 B2
(45) Date of Patent: Sep. 7, 2021

(54) APPARATUS AND METHOD FOR CONTROLLING MPPT OF PHOTOVOLTAIC SYSTEM USING ACTIVE POWER CONTROL

(71) Applicant: Industry-Academic Cooperation Foundation, Yonsei University, Seoul (KR)

(72) Inventors: Yongcheol Kang, Jeonju-si (KR); Jungwook Park, Seoul (KR); Hyoungkyu Yang, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 16/903,826

(22) Filed: Jun. 17, 2020

(65) Prior Publication Data

US 2020/0403412 A1    Dec. 24, 2020

(30) Foreign Application Priority Data

Jun. 18, 2019    (KR) .......................... 10-2019-0072448

(51) Int. Cl.
*H02J 3/38*    (2006.01)
*H02M 1/44*    (2007.01)
*H02M 7/5395*    (2006.01)

(52) U.S. Cl.
CPC .............. *H02J 3/381* (2013.01); *H02M 1/44* (2013.01); *H02M 7/5395* (2013.01); *H02J 2300/26* (2020.01)

(58) Field of Classification Search
CPC .......... H02J 3/38; H02J 3/381; H02J 2300/26; H02M 1/44; H02M 7/5395
See application file for complete search history.

(56) References Cited

U.S. PATENT DOCUMENTS

2019/0384340 A1* 12/2019 Li ........................... H02J 3/385

FOREIGN PATENT DOCUMENTS

| KR | 10-2013-0032035 A | 4/2013 |
|---|---|---|
| KR | 10-1595060 B1 | 2/2016 |
| KR | 10-2017-0064874 A | 6/2017 |

* cited by examiner

*Primary Examiner* — Robert L Deberadinis
(74) *Attorney, Agent, or Firm* — Paratus Law Group, PLLC

(57) ABSTRACT

Disclosed is an apparatus and method for controlling maximum power point tracking (MPPT) of a photovoltaic system using active power control. The apparatus includes a photovoltaic panel, a photovoltaic inverter unit which converts direct current (DC) power received from the photovoltaic panel into alternating current (AC) power and outputs the AC power used as commercial power, and an active power-based inverter control unit which determines a reference value ($P_{mpp}$) for output power ($P_{inv}$) of a photovoltaic inverter using a curve ($P_{mpp}$) connecting maximum power points according to a change in solar irradiance in a P-V curve showing a relationship between photovoltaic output power and a terminal voltage and measures a terminal voltage ($V_{pv}$) of the photovoltaic panel to allow the photovoltaic inverter to perform an operation according to MPPT control for tracking a value of the terminal voltage changed according to the solar irradiance.

9 Claims, 7 Drawing Sheets

APPARATUS AND METHOD FOR CONTROLLING MPPT OF PHOTOVOLTAIC SYSTEM USING ACTIVE POWER CONTROL

CROSS-REFERENCE TO RELATED APPLICATION

This application claims priority under 35 U.S.C. § 119 to Korean Application No. 10-2019-0072448 (filed on Jun. 18, 2019), which is hereby incorporated by reference in its entirety.

ACKNOWLEDGEMENT

This work was supported by a National Research Foundation of Korea (NRF) grant funded by a Ministry of Science and ICT (MIST), Korea government (No. 2020R1A3B2079407).

BACKGROUND

The present invention relates to a photovoltaic system, and more particularly, to an apparatus and method for controlling maximum power point tracking (MPPT) of a photovoltaic system using active power control, in which MPPT is performed based on active power control to rapidly and accurately track a maximum power point, thereby realizing high power generation efficiency of a photovoltaic system.

In photovoltaic systems for generating power by receiving solar energy, a relationship between output power and a terminal voltage has a characteristic that is convex upward.

There is a value of the terminal voltage for producing the maximum output power of the photovoltaic system, and the terminal voltage for obtaining the maximum output power is changed as a solar irradiance is changed.

Therefore, in order for the photovoltaic system to produce the maximum output power even when the solar irradiance is changed, it is necessary to control maximum power point tracking (MPPT) to track a value of the terminal voltage changed according to the solar irradiance.

As MPPT method for photovoltaic systems mainly used in the related art, there is perturbation and observation (P&O) method.

FIG. 1 is a block diagram of a general photovoltaic system, and FIG. 2 is a block diagram of a photovoltaic inverter control unit based on voltage control according to the related art.

The photovoltaic system includes a photovoltaic panel 10 which generates electrical energy through a photoelectric effect according to incidence of sunlight, a parallel capacitor 11 which is positioned between the photovoltaic panel 10 and a photovoltaic inverter 12 to maintain a terminal voltage in a narrow range, the photovoltaic inverter 12 which converts direct current (DC) power received from the photovoltaic panel 10 into alternating current (AC) power and outputs the AC power used as commercial power, a filter 13 which removes noise included in AC power output from the photovoltaic inverter 12, and a utility grid 14 which is connected to an output terminal of the filter 13.

In the related art, the photovoltaic system is controlled through an MPPT method based on voltage control, and the terminal voltage and an output current of the photovoltaic panel are measured to perform MPPT through a reference value of the terminal voltage.

In order to control MPPT method based on voltage control, as shown in FIG. 2, the photovoltaic inverter control unit includes an MPPT controller 21 which receives a current value $i_{pv}$ of the photovoltaic panel 10 and a terminal voltage $V_{pv}$ of the parallel capacitor 11 to control MPPT for tracking a value of the terminal voltage changed according to a solar irradiance, a DC-voltage controller 22 which receives an output $V^*_{pv}$ of the MPPT controller 21 and the terminal voltage $V_{pv}$ of the parallel capacitor 11 to output an inverter power control signal $P^*_{inv}$ for controlling the photovoltaic inverter 12, a power controller 23 which receives the inverter power control signal $P^*_{inv}$ from the DC-voltage controller 22 to output a grid current control signal $I^*_{grid}$, a phase locked loop (PLL) 25 which receives a grid voltage $V_{grid}$ to output a phase angle θ for synchronizing the grid voltage, a current controller 24 which receives a grid current $i_{grid}$, the phase angle θ of the PLL 25, and the grid current control signal $I^*_{grid}$ to output a signal m for controlling a pulse width modulation (PWM), and a PWM control signal generator 26 which receives the signal m of the current controller 24 to output a PWM control signal for controlling an output of the photovoltaic inverter 12.

Such a method is a method of finding a maximum power point by slightly changing the terminal voltage of the photovoltaic system and then comparing a changed photovoltaic output power value with a previous output power value to change the terminal voltage in a direction in which output power is increased.

However, when a change amount of the terminal voltage is small, oscillation around the maximum power point is small, but a tracking speed for the MPPT is slow. When the change amount is great, the tracking speed for the MPPT is fast, but oscillation occurs around the maximum power point.

A method of using an energy storage system (ESS) is considered to mitigate output oscillation of the photovoltaic system, but this has a problem of increasing installation costs of the photovoltaic system.

In addition, when the P&O method is used, photovoltaic output power is rapidly changed when a solar irradiance is increased or decreased. Such a rapid change in the photovoltaic output power leads to a rapid change in frequency of a power grid, and thus, reserve power for mitigating the change in the frequency is additionally required, which has a negative effect such as an increase in costs of operating the power grid.

When such problems are not solved and when a large capacity photovoltaic system is connected to a power grid, an output power limitation of the photovoltaic system becomes inevitable, thereby resulting in degradation in economic efficiency of the photovoltaic system.

In addition, such a method has a disadvantage in that an additional current sensor is required to calculate an output power of the photovoltaic system, which increases costs.

As described above, in the control of the photovoltaic system using the MPPT method based on voltage control according to the related art, a tracking speed is slow, and oscillation occurs severely around the maximum power point. Accordingly, there is a problem in that output power cannot converge to the maximum power point.

In addition, there is a problem according to an abrupt change in output power due to feed-forward control for maintaining a terminal voltage when a solar irradiance is changed, and there is a problem of an increase in costs due to use of a current sensor for calculating an output power of the photovoltaic panel.

In order to minimize influences on high power generation efficiency of a photovoltaic system and a change in frequency of a power grid, it should be possible to rapidly and accurately track a maximum power point.

In addition, in order to lower initial investment costs of the photovoltaic system, a price of a power generation system should be low.

Therefore, there is a need to develop new technology for providing a photovoltaic system in which, even when a solar irradiance is changed, output power is gradually increased to very rapidly reach a target value without overshoot, and oscillation does not occur even around a maximum power point.

RELATED ART DOCUMENTS

Patent Documents (Patent Document 1) Korean Patent Registration No. 10-1595060
(Patent Document 2) Korean Patent Publication No. 10-2017-0064874
(Patent Document 3) Korean Patent Publication No. 10-2013-0032035

SUMMARY

The present invention is directed to providing an apparatus and method for controlling maximum power point tracking (MPPT) of a photovoltaic system using active power control, in which MPPT is performed based on active power control to rapidly and accurately track a maximum power point, thereby realizing high power generation efficiency of a photovoltaic system.

The present invention is directed to providing an apparatus and method for controlling MPPT of a photovoltaic system using active power control, in which, even when a solar irradiance is changed, output power is gradually increased to very rapidly reach a target value without overshoot, and oscillation does not occur even around a maximum power point.

The present invention is directed to providing an apparatus and method for controlling MPPT of a photovoltaic system using active power control, in which only a value of a terminal voltage of a photovoltaic panel is measured to determine a reference value for output power of a photovoltaic inverter from the measured value and to perform MPPT, thereby rapidly and accurately tracking a maximum power point to minimize influences on high power generation efficiency of a photovoltaic system and a change in frequency of a power grid.

Objects of the present invention are not limited to the foregoing objects and any other objects not mentioned herein may be clearly understood by a person skilled in the art from the present invention described hereinafter.

According to an aspect of the present invention, there is provided an apparatus for controlling MPPT of a photovoltaic system using active power control, the apparatus including a photovoltaic panel, a photovoltaic inverter unit which converts direct current (DC) power received from the photovoltaic panel into alternating current (AC) power and outputs the AC power used as commercial power, and an active power-based inverter control unit which determines a reference value ($P_{mpp}$) for output power ($P_{inv}$) of a photovoltaic inverter using a curve ($P_{mpp}$) connecting maximum power points according to a change in solar irradiance in a P-V curve showing a relationship between photovoltaic output power and a terminal voltage and measures a terminal voltage ($V_{pv}$) of the photovoltaic panel to allow the photo-voltaic inverter to perform an operation according to MPPT control for tracking a value of the terminal voltage changed according to the solar irradiance.

The photovoltaic inverter unit may include a parallel capacitor, which is positioned between the photovoltaic panel and the photovoltaic inverter, to maintain the terminal voltage in a predetermined range, the photovoltaic inverter which converts the DC power received from the photovoltaic panel into the AC power and outputs the AC power used as the commercial power, a filter which removes noise included in AC power output from the photovoltaic inverter, and a utility grid connected to an output terminal of the filter.

The active power-based inverter control unit may include an inverter power control signal output unit which receives a value of a terminal voltage ($V_{pv}$) of a parallel capacitor and determines the reference value ($P_{mpp}$) for the output power ($P_{inv}$) of the photovoltaic inverter from the received value to output an inverter power control signal ($P^*_{inv}$), a power controller which receives the inverter power control signal ($P^*_{inv}$) from the inverter power control signal output unit to output a grid current control signal ($I^*_{grid}$), a phase locked loop (PLL) which receives a grid voltage ($V_{grid}$) to output a phase angle ($\theta$) for synchronizing the grid voltage, a current controller which receives a grid current ($i_{grid}$), the phase angle ($\theta$) of the PLL, and the grid current control signal ($I^*_{grid}$) to output an output control signal (m) for controlling a pulse width modulation (PWM), and a PWM control signal generator which receives the output control signal (m) of the current controller to output a PWM control signal for controlling an output of the photovoltaic inverter.

According to another aspect of the present invention, there is provided a method of controlling MPPT of a photovoltaic system using active power control, the method including inputting a terminal voltage ($V_{pv}$) of a parallel capacitor to an active power-based inverter control unit, receiving, by an inverter power control signal output unit of the active power-based inverter control unit, a value of the terminal voltage ($V_{pv}$) and determining a reference value ($P_{mpp}$) for output power ($P_{inv}$) of a photovoltaic inverter from the received value to output an inverter power control signal ($P^*_{inv}$), receiving, by a power controller, the inverter power control signal ($P^*_{inv}$) from the inverter power control signal output unit to output a grid current control signal ($I^*_{grid}$), receiving, by a current controller, a grid current ($i_{grid}$), a phase angle ($\theta$) of a PLL, and the grid current control signal ($I^*_{grid}$) to output an output control signal (m) for controlling a PWM, receiving, by a PWM control signal generator, the output control signal (m) of the current controller to output a PWM control signal for controlling an output of the photovoltaic inverter, and performing, by the photovoltaic inverter, an operation according to MPPT control for tracking the value of the terminal voltage changed according to a solar irradiance.

In the determining of the reference value ($P_{mpp}$) for the output power ($P_{inv}$) of the photovoltaic inverter to output the inverter power control signal ($P^*_{inv}$), the reference value ($P_{mpp}$) for the output power ($P_{inv}$) of the photovoltaic inverter may be determined using a curve ($P_{mpp}$) connecting maximum power points according to a change in solar irradiance in a P-V curve showing a relationship between photovoltaic output power and the terminal voltage.

Power ($P_{Cpv}$) supplied to the parallel capacitor may be a difference between output power ($P_{pv}$) of a photovoltaic panel and the output power $P_{inv}$ of the photovoltaic inverter and may be defined by an Equation below:

$$C_{pv} V_{pv} \frac{dV_{pv}}{dt} = P_{pv} - P_{inv},$$

wherein $C_{pv}$ refers to capacitance of the parallel capacitor, $V_{pv}$ refers to a terminal voltage of the photovoltaic panel, $P_{pv}$ is determined by the solar irradiance, a temperature, and $V_{pv}$, and $P_{inv}$ is controlled by controlling active power of the photovoltaic inverter.

When the solar irradiance is changed from a first value to a second value greater than the first value, the output power ($P_{pv}$) of the photovoltaic panel may be changed from output (A) of the photovoltaic panel with respect to the first value of the solar irradiance to output (A') of the photovoltaic panel with respect to the second value of the solar irradiance, and the output power ($P_{inv}$) of the photovoltaic inverter may be not changed so that the output power ($P_{pv}$) of the photovoltaic panel may have a value greater than that of the output power ($P_{inv}$) of photovoltaic inverter.

The output power ($P_{pv}$) of the photovoltaic panel having the value greater than that of the output power ($P_{inv}$) of the photovoltaic inverter may mean that a right side of the Equation has a positive value, and when the solar irradiance is increased, the terminal voltage ($V_{pv}$) of the photovoltaic panel may be increased.

When the terminal voltage ($V_{pv}$) of the photovoltaic panel is increased, an operating point of the output power ($P_{pv}$) of the photovoltaic panel may move from a position (A') to another position (B') in a P-V curve showing a relationship between photovoltaic output power and the terminal voltage, an operating point of the output power ($P_{inv}$) of the photovoltaic inverter may move from a position (A) to another position (B) in a curve ($P_{mpp}$) connecting maximum power points, and even in this case, the output power ($P_{pv}$) of the photovoltaic panel may have a value greater than that of the output power ($P_{inv}$) of the photovoltaic inverter so that the terminal voltage ($V_{pv}$) of the photovoltaic panel may be further increased.

When the terminal voltage ($V_{pv}$) of the photovoltaic panel is further increased, the operating point of the output power ($P_{pv}$) of the photovoltaic panel may move to an intersection of two curves along the P-V curve showing the relationship between the photovoltaic output power and the terminal voltage, and the operating point of the output power ($P_{inv}$) of the photovoltaic inverter may move to the intersection along the curve ($P_{mpp}$) connecting the maximum power points so that the output power ($P_{pv}$) of the photovoltaic panel may have the same value as that of the output power ($P_{inv}$) of the photovoltaic inverter, the terminal voltage ($V_{pv}$) of the photovoltaic panel may converge, and the output power ($P_{inv}$) of the photovoltaic inverter may also have a constant value.

DETAILED DESCRIPTION

Hereinafter, exemplary embodiments of an apparatus and method for controlling maximum power point tracking (MPPT) of a photovoltaic system using active power control according to the present invention will be described in detail.

The features and advantages of the apparatus and method for controlling MPPT of a photovoltaic system using active power control according to the present invention will be apparent through the following detailed descriptions of exemplary embodiments.

Figure 1:
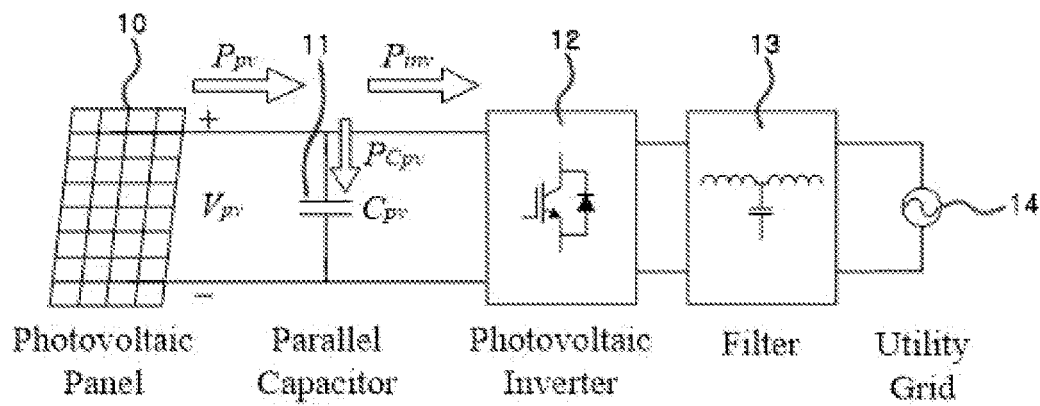
FIG. 1 is a block diagram of a general photovoltaic system.
Figure 2:
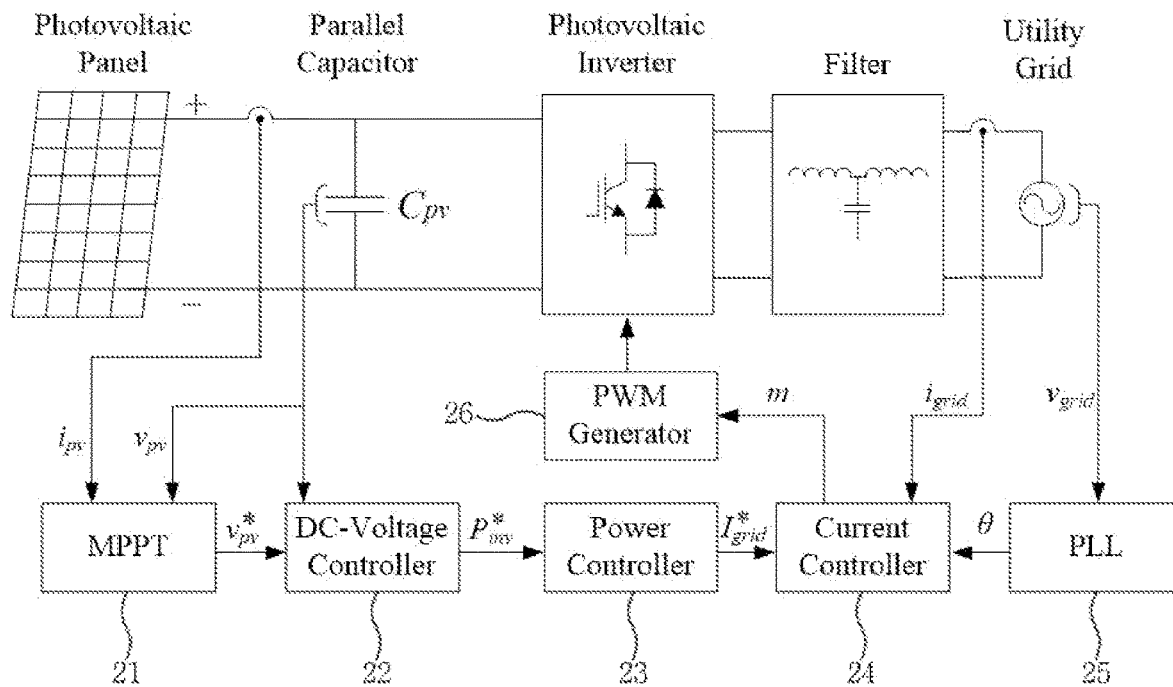
FIG. 2 is a block diagram of a photovoltaic inverter control unit based on voltage control according to a related art.
Figure 3:
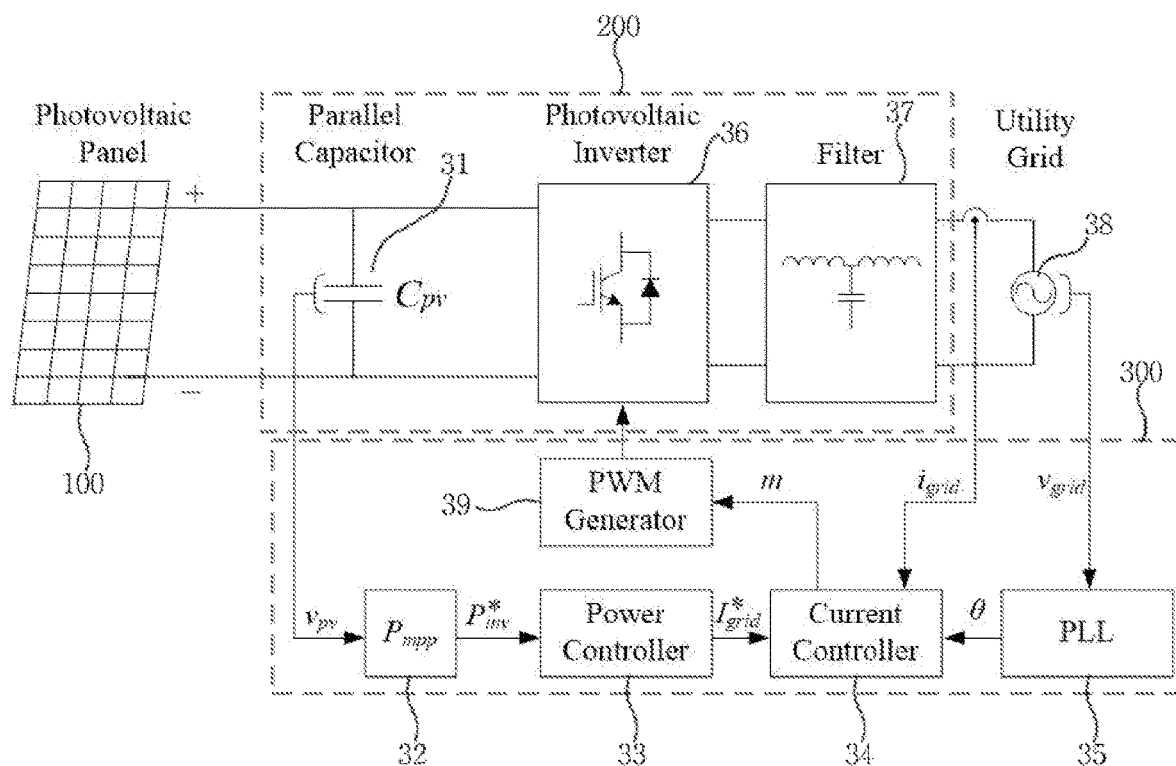
FIG. 3 is a block diagram of an apparatus for controlling maximum power point tracking (MPPT) of a photovoltaic system using active power control according to the present invention.

FIG. 3 is a block diagram of the apparatus for controlling MPPT of a photovoltaic system using active power control according to the present invention.

According to the apparatus and method for controlling MPPT of a photovoltaic system using active power control according to the present invention, only a value of a terminal voltage of a photovoltaic panel may be measured to determine a reference value for output power of a photovoltaic inverter from the measured value and to perform MPPT, thereby rapidly and accurately tracking a maximum power point to minimize influences on high power generation efficiency of a photovoltaic system and a change in frequency of a power grid.

To this end, as shown in FIG. 3, the apparatus for controlling MPPT of a photovoltaic system using active power control according to the present invention mainly includes a photovoltaic panel 100, a photovoltaic inverter unit 200 which converts direct current (DC) power received from the photovoltaic panel 100 into alternating current (AC) power and outputs the AC power used as commercial power, and an active power-based inverter control unit 300 which measures only a value of a terminal voltage of the photovoltaic panel 100 and determines a reference value for output power of an photovoltaic inverter from the measured value to perform MPPT.

Specifically, the apparatus includes the photovoltaic panel 100 which generates electrical energy through a photoelectric effect according to incidence of sunlight.

The photovoltaic inverter unit 200 includes a parallel capacitor 31 which is positioned between the photovoltaic panel 100 and a photovoltaic inverter 36 to maintain the terminal voltage in a narrow range, the photovoltaic inverter 36 which converts the DC power received from the photovoltaic panel 100 into the AC power and outputs the AC power used as commercial power, a filter 37 which removes noise included in AC power output from the photovoltaic inverter 36, and a utility grid 38 which is connected to an output terminal of the filter 37.

The active power-based inverter control unit 300 includes an inverter power control signal output unit 32 which receives a value of a terminal voltage $V_{pv}$ of the parallel capacitor 31 and determines a reference value $P_{mpp}$ for output power $P_{inv}$ of the photovoltaic inverter from the received value to output an inverter power control signal $P^*_{inv}$, a power controller 33 which receives the inverter power control signal $P^*_{inv}$ from the inverter power control signal output unit 32 to output a grid current control signal $I^*_{grid}$, a phase locked loop (PLL) 35 which receives a grid voltage $V_{grid}$ to output a phase angle θ for synchronizing the grid voltage, a current controller 34 which receives a grid current $i_{grid}$, the phase angle θ of the PLL 25, and the grid current control signal $I^*_{grid}$ to output an output control signal m for controlling a pulse width modulation (PWM), and a PWM control signal generator 39 which receives the output control signal m of the current controller 24 to output a PWM control signal for controlling an output of the photovoltaic inverter 36.

The method of controlling MPPT of a photovoltaic system using active power control according to the present invention will be described in detail below.

Figure 4:
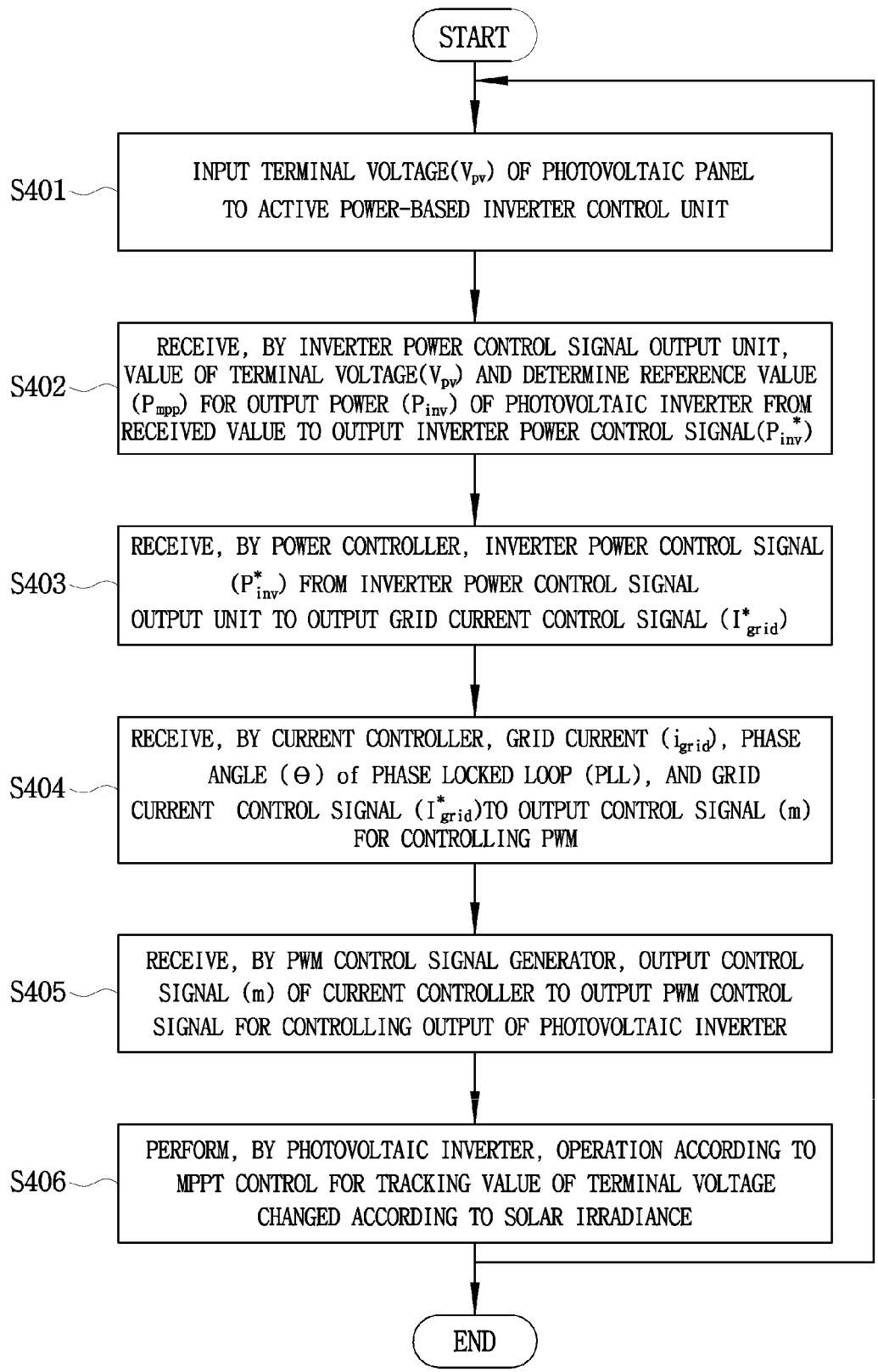
FIG. 4 is a flowchart illustrating a method of controlling MPPT of a photovoltaic system using active power control according to the present invention.

FIG. 4 is a flowchart illustrating the method of controlling MPPT of a photovoltaic system using active power control according to the present invention.

First, when the photovoltaic panel 100 generates electrical energy through a photoelectric effect according to incidence of sunlight, the active power-based inverter control unit 300 receives a terminal voltage $V_{pv}$ of the photovoltaic panel 100 through the parallel capacitor 31 (S401).

Subsequently, the inverter power control signal output unit 32 receives a value of the terminal voltage $V_{pv}$ and determines a reference value $P_{mpp}$ for output power $P_{inv}$ of the photovoltaic inverter from the received value to output an inverter power control signal $P^*_{inv}$ (S402).

The power controller 33 receives the inverter power control signal $P^*_{inv}$ from the inverter power control signal output unit 32 to output a grid current control signal $I^*_{grid}$ (S403).

Next, the current controller 34 receives a grid current $i_{grid}$, a phase angle θ of the PLL 35, and the grid current control signal $I^*_{grid}$ to output an output control signal m for controlling a PWM (S404).

The PWM control signal generator 39 receives the output control signal m of the current controller 34 to output a PWM control signal for controlling an output of the photovoltaic inverter 36 (S405), and the photovoltaic inverter 36 performs an operation according to MPPT control for tracking a value of a terminal voltage changed according to a solar irradiance (S406).

MPPT method based on active power control of the apparatus and method for controlling MPPT of a photovoltaic system using active power control according to the present invention having such a configuration will be described in detail below.

Figure 5:
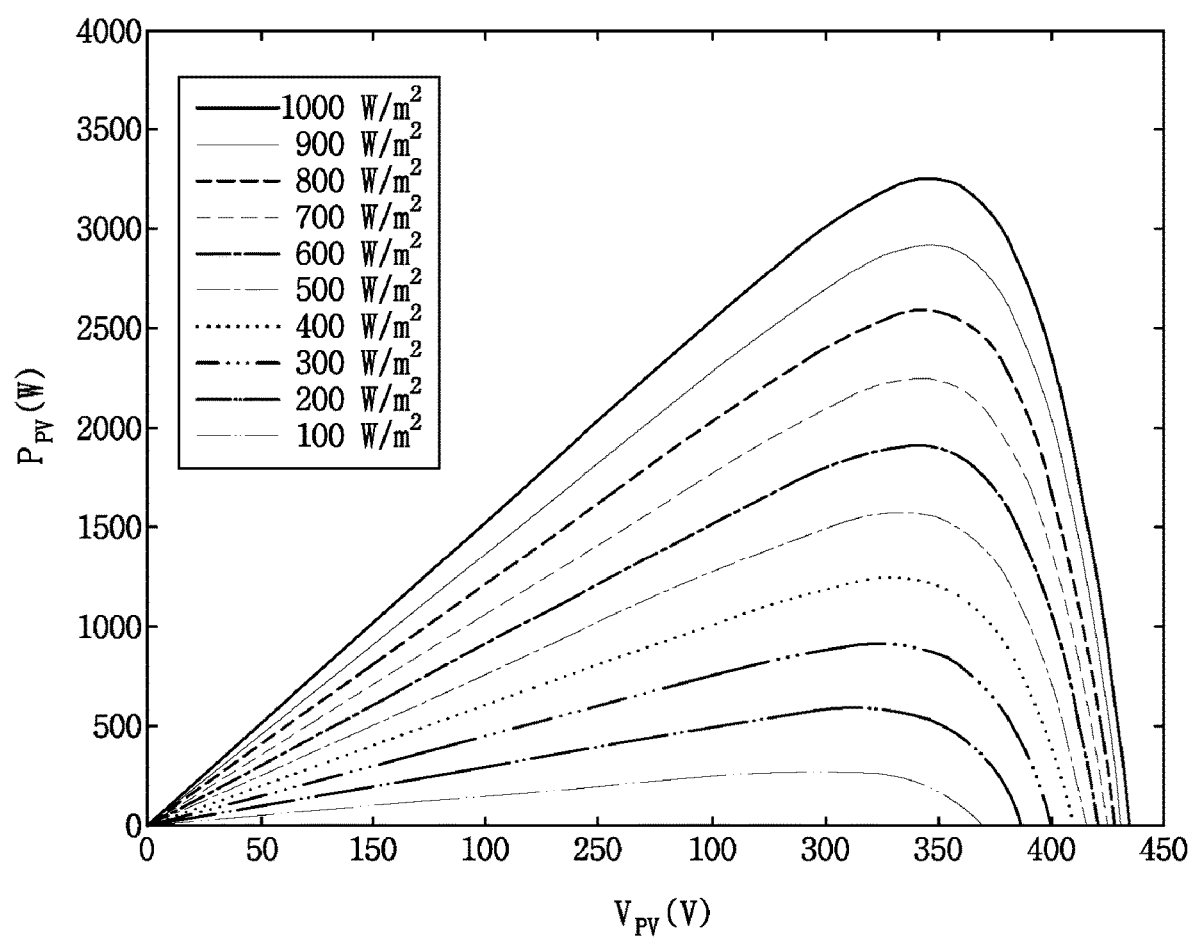
FIG. 5 is a graph showing P-V curves of a photovoltaic panel.
Figure 6:
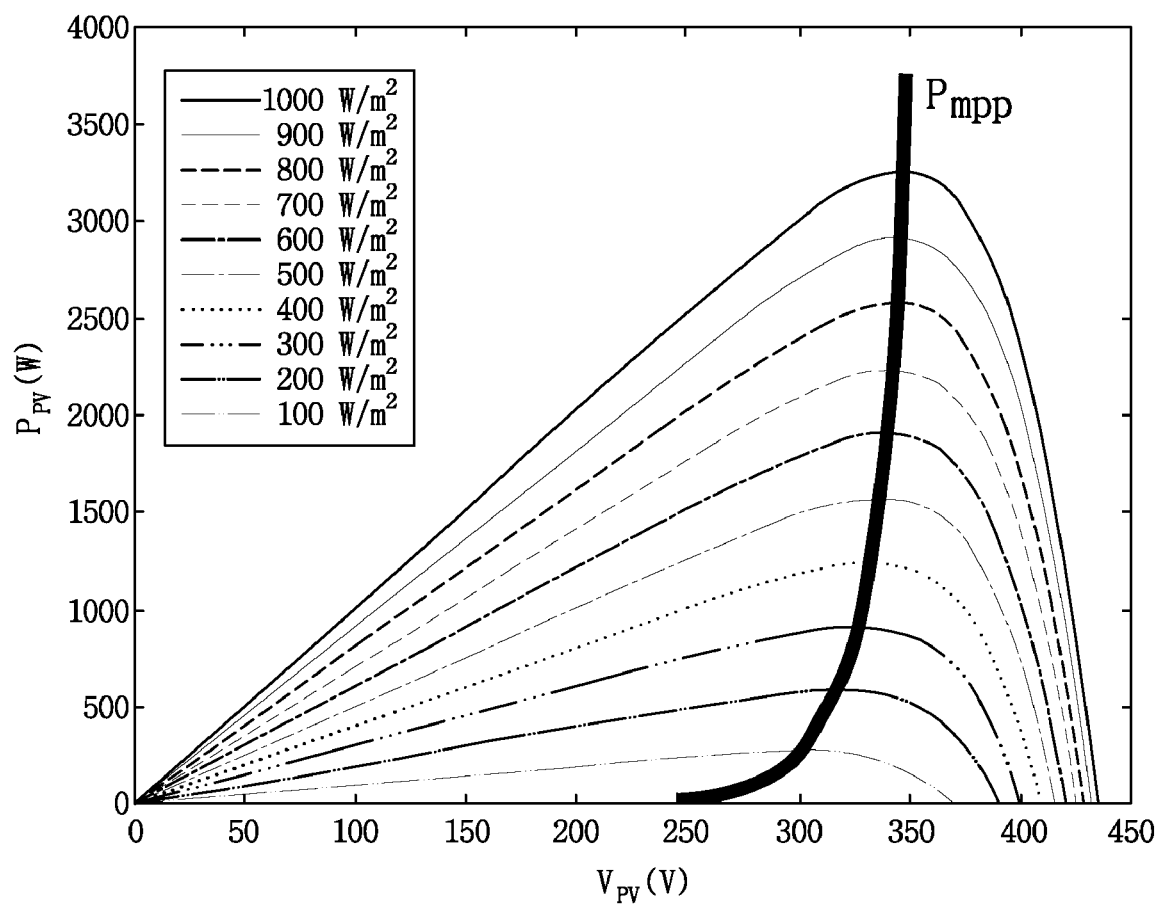
FIG. 6 is a graph showing a $P_{mpp}$ curve of the photovoltaic panel.

FIG. 5 is a graph showing P-V curves of a photovoltaic panel, and FIG. 6 is a graph showing a $P_{mpp}$ curve of the photovoltaic panel.

A parallel capacitor is essentially connected between a photovoltaic panel and a photovoltaic inverter to maintain a terminal voltage in a narrow range. Power $P_{Cpv}$ supplied to the parallel capacitor may be expressed as a difference between output power $P_{pv}$ of the photovoltaic panel and output power $P_{inv}$ of the photovoltaic inverter as follows.

$$C_{pv} V_{pv} \frac{dV_{pv}}{dt} = P_{pv} - P_{inv}. \quad \text{[Equation 1]}$$

Here, $C_{pv}$ refers to capacitance of the parallel capacitor, and $V_{pv}$ refers to a terminal voltage of the photovoltaic panel. In addition, $P_{pv}$ is determined by a solar irradiance, a temperature, and $V_{pv}$, and $P_{inv}$ is adjustable by controlling active power of the photovoltaic inverter.

A relationship between photovoltaic output power and a terminal voltage is referred to as a P-V curve, and FIG. 5 shows P-V curves in a plurality of solar irradiances when a temperature is constant.

Since the P-V curve has a characteristic that is convex upward, one value of a terminal voltage, which exhibits maximum power, is present according to a solar irradiance.

FIG. 6 shows a curve $P_{mpp}$ connecting maximum power points of the P-V curves in the plurality of solar irradiances of FIG. 5, and $P_{mpp}$ has a characteristic that is changed according to a terminal voltage.

In the present invention, MPPT method based on active power control is performed, and $P_{mpp}$ of FIG. 6 is used as a reference value for the output power $P_{inv}$ of the photovoltaic inverter.

Figure 7:
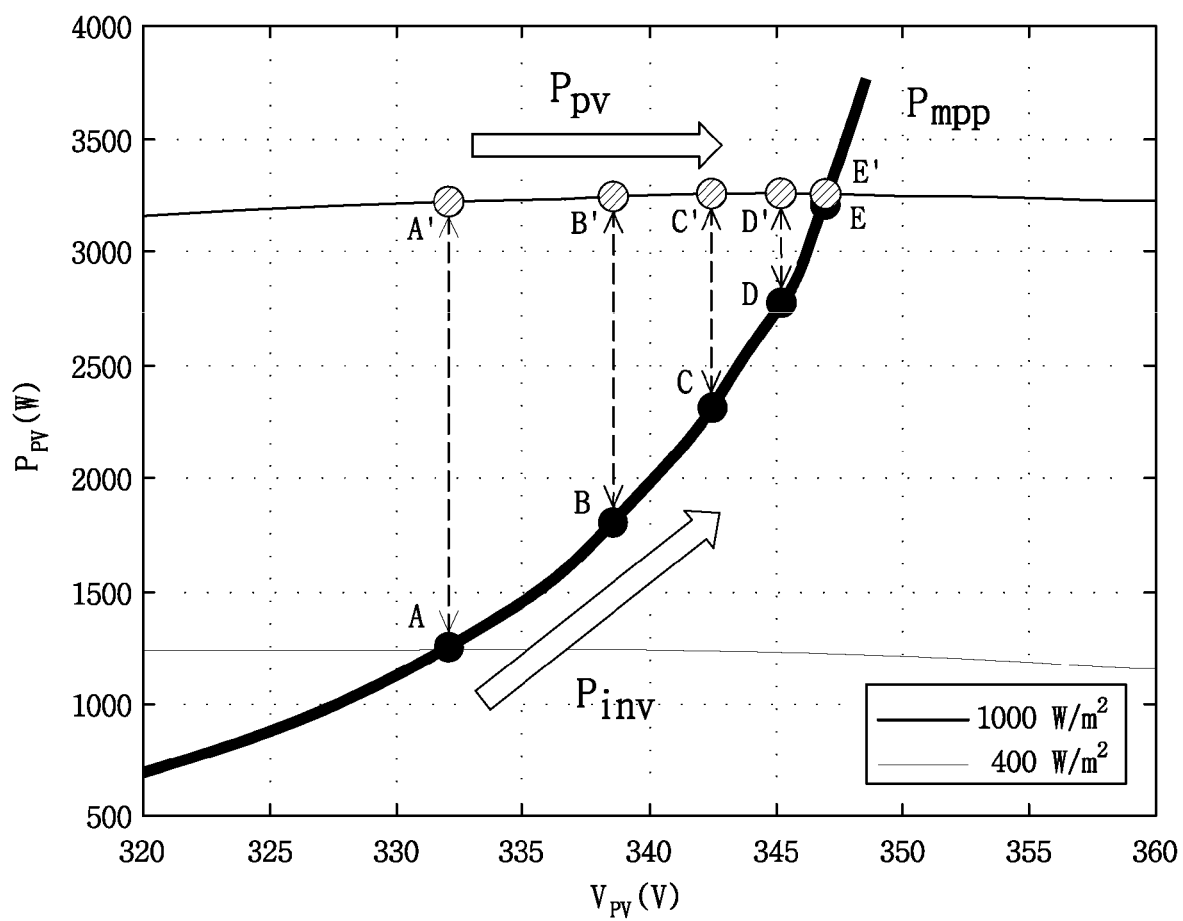
FIG. 7 is a graph showing a process of tracking a maximum power point when a solar irradiance is changed according to the present invention.

FIG. 7 is a graph showing a process of tracking a maximum power point when a solar irradiance is changed according to the present invention.

FIG. 7 shows the process of tracking a maximum power point according to the present invention when a solar irradiance is changed from 400 W/m² to 1,000 W/m².

Assuming that the photovoltaic system performs MPPT when the solar irradiance is 400 W/m², both $P_{pv}$ and $P_{inv}$ are 1,250 W. In this case, a terminal voltage is 332 V, and an operating point is point A in FIG. 7.

Here, assuming that the solar irradiance is increased from 400 W/m² to 1,000 W/m², $P_{pv}$ moves from point A to point A', and $P_{inv}$ remains at point A.

Therefore, $P_{pv}$ has a value greater than that of $P_{inv}$, which means that a right side of Equation 1 has a positive value, and $V_{pv}$ is increased according to Equation 1.

In this case, $P_{inv}$ moves from point A to point B, and $P_{pv}$ moves from point A' to point B'. Even in this case, the right side of Equation 1 also has a positive value, and thus, $V_{pv}$ is gradually increased.

In this way, as $V_{pv}$ is gradually increased, $P_{inv}$ reaches point E through point C and point D, and $P_{pv}$ also reaches point E' (identical to point E) through point C' and point D'. $P_{pv}$ and $P_{inv}$ have the same value at point E (or E'). In this case, since the right side of Equation 1 becomes zero, $V_{pv}$ is not increased or decreased any more and remains at point E.

Specifically, when the solar irradiance is changed from a first value (400 W/m²) to a second value (1,000 W/m²) greater than the first value, the output power $P_{pv}$ of the photovoltaic panel moves from output (point A of FIG. 7) of the photovoltaic panel with respect to the first value of the solar irradiance to output (point A' of FIG. 7) of the photovoltaic panel with respect to the second value of the solar irradiance. Since the output power $P_{inv}$ of the photovoltaic inverter remains at point A, the output power $P_{pv}$ (point A') of the photovoltaic panel has a value greater than that of the output power $P_{inv}$ (point A) of the photovoltaic inverter.

The output power $P_{pv}$ of the photovoltaic panel having a value greater than that of the output power $P_{inv}$ of the photovoltaic inverter means that the right side of Equation 1 has a positive value, and when the solar irradiance is increased, the terminal voltage $V_{pv}$ of the photovoltaic panel is increased.

As described above, when the terminal voltage $V_{pv}$ of the photovoltaic panel is increased, the output power $P_{pv}$ of the photovoltaic panel moves from point A' of FIG. 7 to point B' of FIG. 7, and the output power $P_{inv}$ of the photovoltaic inverter moves from point A to point B. Even in this case, since the output power $P_{pv}$ of the photovoltaic panel has a value greater than that of the output power $P_{inv}$ of the photovoltaic inverter, the terminal voltage $V_{pv}$ of the photovoltaic panel is further increased.

As described above, when the terminal voltage $V_{pv}$ of the photovoltaic panel is further increased, the output power $P_{pv}$ of the photovoltaic panel moves from point B' of FIG. 7 to point E' through point C'. When the output power $P_{inv}$ of the photovoltaic inverter moves from point B to point E through point C and point D, the output power $P_{pv}$ of the photovoltaic panel has the same value as that of the output power $P_{inv}$ of the photovoltaic inverter. Thus, the terminal voltage $V_{pv}$ converges, and the output power $P_{inv}$ of the photovoltaic inverter also has a constant value.

Figure 8:
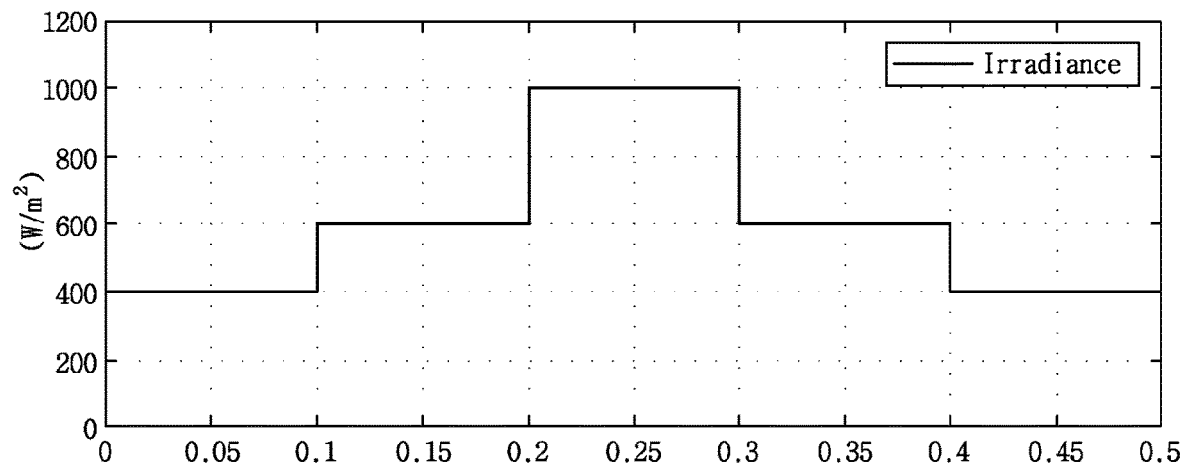
FIG. 8 shows graphs showing an output power comparison between a photovoltaic inverter according to a P&O method and the present invention when a solar irradiance is changed.
Figure 8:
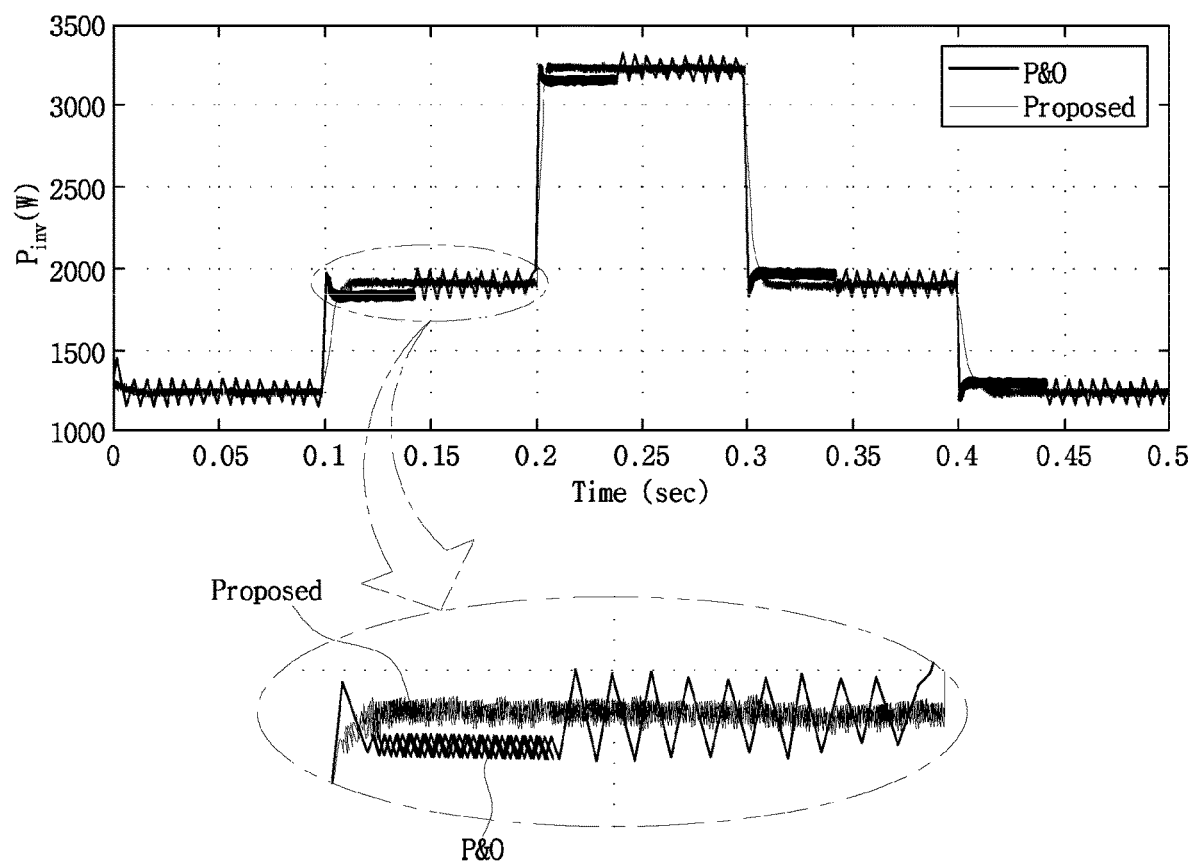

FIG. 8 shows graphs showing an output power comparison between a photovoltaic inverter according to a P&O method and the present invention when a solar irradiance is changed.

When a solar irradiance is changed in the order of 400 W/m², 600 W/m², 1,000 W/m², 600 W/m², and 400 W/m² at 0.1 second intervals, output power of an MPPT method based on active power control according to the present invention is compared with output power according to the P&O method.

As shown in FIG. 8, in the P&O method, it can be seen that, at a moment when a solar irradiance is changed, output power is rapidly increased, overshoot occurs, a maximum power point is tracked late, and oscillation is also very severe even around the maximum power point.

On the other hand, in the MPPT method based on active power control according to the present invention, it can be seen that, even when a solar irradiance is changed, output power is gradually increased to very rapidly reach a target value without overshoot, and oscillation does not occur even around a maximum power point.

According to the above described apparatus and method for controlling MPPT of a photovoltaic system using active power control according to the present invention, even when a solar irradiance is changed, output power is gradually increased to very rapidly reach a target value without overshoot, and oscillation does not occur around a maximum power point. Thus, it is possible to rapidly track a maximum power point with respect to a frequent change in solar irradiance, and it is possible to provide constant output power even after the tracking to expect a more power amount under the same conditions such as the same solar irradiance and the same temperature.

The apparatus and method for controlling MPPT of a photovoltaic system using active power control according to the present invention as described above has the following effects.

First, MPPT is performed based on active power control to rapidly and accurately track a maximum power point, thereby realizing high power generation efficiency of a photovoltaic system.

Second, even when a solar irradiance is changed, output power is gradually increased to very rapidly reach a target value without overshoot, and oscillation does not occur even around a maximum power point.

Third, only a value of a terminal voltage of a photovoltaic panel is measured to determine a reference value for output power of a photovoltaic inverter from the measured value and to perform MPPT, thereby rapidly and accurately tracking a maximum power point to minimize influences on high power generation efficiency of a photovoltaic system and a change in frequency of a power grid.

Fourth, it is possible to rapidly track a maximum power point with respect to a frequent change in solar irradiance, and it is possible to provide constant output power even after the tracking to anticipate a higher power amount under the same conditions such as the same solar irradiance and the same temperature, thereby assisting in securing economical efficiency of a photovoltaic system.

Fifth, it is possible to minimize a change in frequency of a system by gradually controlling a change in power supplied to the system even in the case of an abrupt change in solar irradiance, thereby assisting in improving acceptability of a photovoltaic system.

Sixth, it is possible to reduce the number of current sensors used to control a photovoltaic system, thereby lowering production costs to lower initial investment costs of photovoltaic power generation.

As described above, it may be understood that the present invention has been implemented as various modified exemplary embodiments without deviating from the intrinsic features of the present invention.

Therefore, the exemplary embodiments as described above should be considered not in a limited viewpoint but in an illustrative viewpoint. The scope of the present invention is not limited to the exemplary embodiment described and illustrated above but is defined by the appended claims. It will be construed that the present invention includes all differences within ranges of the equivalent scope of the claims.

What is claimed is:

1. An apparatus for controlling maximum power point tracking (MPPT) of a photovoltaic system using active power control, the apparatus comprising:
    a photovoltaic panel;
    a photovoltaic inverter unit which converts direct current (DC) power received from the photovoltaic panel into alternating current (AC) power and outputs the AC power used as commercial power; and
    an active power-based inverter control unit which determines a reference value ($P_{mpp}$) for output power ($P_{inv}$) of a photovoltaic inverter using a curve ($P_{mpp}$) connecting maximum power points according to a change in solar irradiance in a P-V curve showing a relationship between photovoltaic output power and a terminal voltage and measures a terminal voltage ($V_{pv}$) of the photovoltaic panel to allow the photovoltaic inverter to perform an operation according to MPPT control for tracking a value of the terminal voltage changed according to the solar irradiance,
    wherein the active power-based inverter control unit includes:
    an inverter power control signal output unit which receives a value of a terminal voltage ($V_{pv}$) of a parallel capacitor and determines the reference value ($P_{mpp}$) for the output power ($P_{inv}$) of the photovoltaic inverter from the received value to output an inverter power control signal ($P^*_{inv}$);
    a power controller which receives the inverter power control signal ($P^*_{inv}$) from the inverter power control signal output unit to output a grid current control signal ($I^*_{grid}$);
    a phase locked loop (PLL) which receives a grid voltage ($V_{grid}$) to output a phase angle ($\theta$) for synchronizing the grid voltage;
    a current controller which receives a grid current ($i_{grid}$), the phase angle ($\theta$) of the PLL, and the grid current control signal ($I^*_{grid}$) to output an output control signal (m) for controlling a pulse width modulation (PWM); and a PWM control signal generator which receives the output control signal (m) of the current controller to output a PWM control signal for controlling an output of the photovoltaic inverter.

2. The apparatus of claim 1, wherein the photovoltaic inverter unit includes:

a parallel capacitor, which is positioned between the photovoltaic panel and the photovoltaic inverter, to maintain the terminal voltage in a predetermined range;

the photovoltaic inverter which converts the DC power received from the photovoltaic panel into the AC power and outputs the AC power used as the commercial power;

a filter which removes noise included in AC power output from the photovoltaic inverter; and a utility grid connected to an output terminal of the filter.

3. A method of controlling maximum power point tracking (MPPT) of a photovoltaic system using active power control, the method comprising:

inputting a terminal voltage ($V_{pv}$) of a parallel capacitor to an active power-based inverter control unit;

receiving, by an inverter power control signal output unit of the active power-based inverter control unit, a value of the terminal voltage ($V_{pv}$) and determining a reference value ($P_{mpp}$) for output power ($P_{inv}$) of a photovoltaic inverter from the received value to output an inverter power control signal ($P^*_{inv}$);

receiving, by a power controller, the inverter power control signal ($P^*_{inv}$) from the inverter power control signal output unit to output a grid current control signal ($I^*_{grid}$);

receiving, by a current controller, a grid current ($i_{grid}$), a phase angle (θ) of a phase locked loop (PLL), and the grid current control signal ($I^*_{grid}$) to output an output control signal (m) for controlling a pulse width modulation (PWM);

receiving, by a PWM control signal generator, the output control signal (m) of the current controller to output a PWM control signal for controlling an output of the photovoltaic inverter; and performing, by the photovoltaic inverter, an operation according to MPPT control for tracking the value of the terminal voltage changed according to a solar irradiance.

4. The method of claim 3, wherein, in the determining of the reference value ($P_{mpp}$) for the output power ($P_{inv}$) of the photovoltaic inverter to output the inverter power control signal ($P^*_{inv}$), the reference value ($P_{mpp}$) for the output power ($P_{inv}$) of the photovoltaic inverter is determined using a curve ($P_{mpp}$) connecting maximum power points according to a change in solar irradiance in a P-V curve showing a relationship between photovoltaic output power and the terminal voltage.

5. The method of claim 3, wherein power ($P_{Cpv}$) supplied to the parallel capacitor is a difference between output power ($P_{pv}$) of a photovoltaic panel and the output power ($P_{inv}$) of the photovoltaic inverter and is defined by an Equation below:

$$C_{pv} V_{pv} \frac{dV_{pv}}{dt} = P_{pv} - P_{inv}, , ,$$

wherein $C_{pv}$ refers to capacitance of the parallel capacitor, $V_{pv}$ refers to a terminal voltage of the photovoltaic panel, $P_{pv}$ is determined by the solar irradiance, a temperature, and $V_{pv}$, and $P_{inv}$ is controlled by controlling active power of the photovoltaic inverter.

6. The method of claim 5, wherein, when the solar irradiance is changed from a first value to a second value greater than the first value, the output power ($P_{pv}$) of the photovoltaic panel is changed from output (A) of the photovoltaic panel with respect to the first value of the solar irradiance to output (A') of the photovoltaic panel with respect to the second value of the solar irradiance, and the output power ($P_{inv}$) of the photovoltaic inverter is not changed so that the output power ($P_{pv}$) of the photovoltaic panel has a value greater than that of the output power ($P_{inv}$) of photovoltaic inverter.

7. The method of claim 6, wherein the output power ($P_{pv}$) of the photovoltaic panel having the value greater than that of the output power ($P_{inv}$) of the photovoltaic inverter means that a right side of the Equation has a positive value, and when the solar irradiance is increased, the terminal voltage ($V_{pv}$) of the photovoltaic panel is increased.

8. The method of claim 7, wherein, when the terminal voltage ($V_{pv}$) of the photovoltaic panel is increased, an operating point of the output power ($P_{pv}$) of the photovoltaic panel moves from a position (A') to another position (B') in a P-V curve showing a relationship between photovoltaic output power and the terminal voltage, an operating point of the output power ($P_{inv}$) of the photovoltaic inverter moves from a position (A) to another position (B) in a curve ($P_{mpp}$) connecting maximum power points, and even in this case, the output power ($P_{pv}$) of the photovoltaic panel has a value greater than that of the output power ($P_{inv}$) of the photovoltaic inverter so that the terminal voltage ($V_{pv}$) of the photovoltaic panel is further increased.

9. The method of claim 8, wherein, when the terminal voltage ($V_{pv}$) of the photovoltaic panel is further increased, the operating point of the output power ($P_{pv}$) of the photovoltaic panel moves to an intersection of two curves along the P-V curve showing the relationship between the photovoltaic output power and the terminal voltage, and the operating point of the output power ($P_{inv}$) of the photovoltaic inverter moves to the intersection along the curve ($P_{mpp}$) connecting the maximum power points so that the output power ($P_{pv}$) of the photovoltaic panel has the same value as that of the output power ($P_{inv}$) of the photovoltaic inverter, the terminal voltage ($V_{pv}$) of the photovoltaic panel converges, and the output power ($P_{inv}$) of the photovoltaic inverter also has a constant value.

* * * * *